United States Patent Office 3,067,102
Patented Dec. 4, 1962

3,067,102
POLYAMIDOHYGROSTREPTIN AND POLYAMINO-HYGROSTREPTIN ANTIFUNGAL PROCESS OF CONTROLLING FUNGUS DISEASES OF THE FOLIAGE OF CONIFEROUS PLANTS
Jack Ziffer, Milwaukee, Wis., assignor to Pabst Brewing Company, Chicago, Ill., a corporation of Delaware
No Drawing. Filed Feb. 23, 1960, Ser. No. 10,030
12 Claims. (Cl. 167—65)

This invention relates to the control of plant diseases by means of antibiotic fungicides, and more particularly, to control of plant diseases by the antibiotics identified by the arbitrary names Phytoactin and Phytostreptin now known by the non-proprietary names of "polyamidohy-grostreptin" and "polyaminohygrostreptin," respectively.

An important object of the invention is to control fungus diseases of coniferous plants.

Another important object is to control fungus diseases caused by Cronartium fungi.

Fungus diseases take a huge toll of plant life. One very important problem is the control of fungus disease of trees and shrubs, and especially of the coniferous plants or conifers. Serious problems of disease control exist in millions of acres of conifer stands both natural and cultivated in this country alone. The seriousness of the problems can be seen on reference to the various publications dealing with timber resources and diseases, for example, the publications of the U.S. Department of Agriculture, Forest Service. Forest Pest Leaflet 36, May 1959, describes the white pine blister rust problem, and Forest Pest Leaflet 32, March 1959, describes the nursery diseases of southern pines. It has been reported that there are now twenty-three million acres in the white pine blister rust control area, which include ten and one-half million acres of the most valuable white pine bearing lands in the country and twelve and one-half million acres in surrounding protective zones. Of this total acreage, eighteen million acres are under maintenance protection and another four million have received partial control. One million acres of control area are not yet receiving any protection.

The magnitude of the problems can be illustrated by the attempts to solve the problem of the fungus disease known as white pine blister rust, the characteristics of which are subsequently described in greater detail. This disease, the second most important forest disease problem in the United States (U.S.D.A. Forest Resource Report No. 14, page 206), is caused by an organism that requires two hosts to survive. The organism spends part of its life on pine trees, and the other part of its life on plants of the genus Ribes, which includes gooseberries and currants. Initial attempts to control white pine blister rust by destroying the rust-infected trees proved impractical. Some measure of control was then obtained by destroying ribes bushes growing in white pine stands and in a protective zone around them. The ribes plants were destroyed either by removing the bushes or by spraying with herbicidal chemicals. Since this method of control requires that men go through the forests and locate the ribes bushes the method is very expensive and requires considerable manpower.

In an effort to overcome the problems of white pine blister rust control, the United States Department of Agriculture Forest Service has tested a number of fungicides over a period of years for the control of this disease. Until recently, only one of these materials has proved to be successful. This successful material is, however, limited in its application, because it translocates upward with only limited downward translocation, and, in addition, is somewhat phytotoxic to pine needles, especially when applied during "flush" periods of growth. Consequently, this material cannot be advantageously applied to the foliage by aerial methods and is, at present, applied by hand to the trunk area of individual trees.

It has been discovered in accordance with the present invention that these problems are overcome with remarkable success by the application of one of the antifungal antibiotics, polyamidohygrostreptin and polyaminohygrostreptin. Applied as foliar sprays, the antibiotics readily translocate downwardly, from the needles into the infected areas of the branches and trunk, and are non-phytotoxic, even when applied during "flush" periods of growth and at concentration levels far in excess of the concentrations required to kill the disease organism. Alternatively, they can be applied as sprays to the trunk area, and will readily translocate upwardly.

The impact of the invention is that successful application of the antifungals by helicopter, fixed-wing planes and ground spray equipment will enable the Forest Service to bring all presently established, reasonably stocked, reproduction, sapling, pole and young mature white pine stands, both inside and outside the established control units, through to maturity without the aid of additional ribes eradication, where the stands have not already been lost to blister rust. In addition, it will enable the Forest Service to use aerial methods for controlling blister rust in not readily accessible forest areas. Further, it will enable the Forest Service to replant areas to white pine and other desirable (blister rust susceptible) pine species with the assurance that blister rust infections will be controlled.

The invention particularly contemplates the control of fungus diseases of coniferous plants. The following is a summary of a number of important stem and cone rust diseases of conifers to which the invention is directed.

STEM AND CONE RUSTS OF CONIFERS

Serious stem diseases of conifers are caused by a number of rust fungi of the genus Cronartium. The growth of these fungi in the bark or wood of the infected coniferous hosts results in various malformations, such as galls, burls or swellings, cankers and witches'-brooms. Trunk infections frequently result in the death of the trees. This is especially true for infected seedlings, saplings and pole trees. Nearly all stem rust fungi are heteroecious, with their alternate growth stages on annual and perennial herbaceous plants, or on broadleaved trees and shrubs. The most destructive of these stem diseases are the blister rusts of pines. In addition to the stem diseases, a number of Cronartium rusts attack the cones of certain conifers, resulting in serious reductions in the amount of seed produced.

The blister rusts of pines are caused by Cronartium rust fungi. These fungi are widely distributed throughout North America, Europe and Asia and attack hard and soft pines. The blister rusts are very destructive, especially to seedlings, saplings and small pole trees. The fungi kill the trees outright, severely reduce their rate of growth, or malform them so that satisfactory timber cannot be produced.

Blister rust infections are characterized by the presence of globose, subglobose or spindle-shaped (fusiform) swellings or galls on the pine stems. The globose- and subglobose-type swellings increase rapidly in diameter but only involve a small portion of the stem length. The fusiform-type swellings grow rapidly in length, spreading for considerable distances up and down the stem, eventually girdling and killing the stem. On large stems, the spindle-shaped swelling is not evident, since such stems either retain their normal size or become somewhat constricted over the infected area.

After the fungus aecial (second spore) stage develops, the infected bark cracks into the cambium layer and the local cambium area dries up and dies. Each year, a larger portion of the stem is involved, until finally, the stem is completely girdled and the stem portion from the infected area to the tip dies. Small stems are killed rapidly; larger ones more slowly. Infections on the trunk area cause the death of the top branches or the entire tree.

The blister rust fungi go through five spore stages during their life cycle; two spore stages in the bark of pines and three spore stages on the foliage of the alternate hosts. Except for the western gall rust (woodgate gall rust), the rust fungi cannot spread directly from pine to pine but must first go through three spore stages on the alternate hosts, before spreading back to pines. Control of the western gall rust (woodgate gall rust) is especially difficult because these fungi can infect from pine to pine, as well as from the alternate hosts.

In general, the blister rust rungi go through the following life cycle. The first spores produced on pines are the Pycniospores, which may appear at any time during the growing season but usually occur during the summer months. There is no well-defined pycnial structure in blister rusts as there is in needle rusts. A flat broad layer of interwoven and anastomosed hyphae forms in the bark under the periderm producing minute oval or elongated Pycniospores and a sweet liquid known as "pycnial nectar" or "exudate." The periderm is forced up in the form of a shallow blister, which finally ruptures, extruding the Pycniospores in the sweet liquid. The pycnial fluid may collect in orange-yellow to clear drops on the bark but it quickly disappears. On stems with rough bark, the pycnia are hard to find. The pycnial nectar is sought by insects, which inadvertently carry the Pycniospores to other pycnia. The Pycniospores do not cause new infections, but are concerned with the nuclear development of the fungus. Pycnia are developed at least one season before aecia appear.

In the spring or early summer, aecia develop over the area occupied by the pycnia during the previous summer. The aecia, consisting of a white membrane, the peridium, enclosing an orange-yellow powdery mass of aeciospores, push their way through the bark as white or yellowish blisters. The peridium soon ruptures, releasing the large aeciospores (second spore stage). After the aeciospores are released, the peridium disintegrates, and the bark cracks down to the cambium layer. The aeciospores are spread by the wind, sometimes for great distances, and infect the leaves or tender stems of the alternate hosts. Aeciospores do not infect other pines except in the species causing western gall rust and woodgate gall rust.

A week or more after infection of the alternate host occurs, the uredia appear on the underside of the alternate host leaves as tiny blister-like pustules. The uredia quickly ruptures releasing a mass of orange urediospores (third spore stage). The urediospores, about the size of the aeciospores but with spiny walls, are wind borne for short distances. The infection spreads and intensifies during this period as additional alternate host plants are infected. The urediospores cannot, however, infect pines.

In the summer or early autumn, telia are formed on the lesions previously occupied by the uredia. The telia are slender brown bristle-like structures, standing up or slightly curved from the leaf, and are composed of vertical rows of elongated angular thin-walled teliospores (fourth spore stage). During moist periods, the teliospores germinate in place by means of a Promycelium bearing four small delicate thin-walled globular sporidia (fifth sport stage). The sporidia are carried by the wind to infect (only) pines. The teliospores do not overwinter.

Pine infection occurs, in at least one species, through the needles. In certain other species, infection occurs through the tender young shoots and small side spurs. After infection occurs, however, it takes one or more years before pycnia develop, completing the life cycle. The fungus mycelium (perennial growth) in pines is largely confined to the inner bark, rarely penetrating the wood.

Most blister rusts can be partially controlled by the eradication of the respective deciduous hosts from within the infected stand, and for some distance around it. Since the width of this safety strip is dependent on the distance to which the delicate sporidia can be blown and still retain viability to infect pines (distance not known for all Cronartium species), the strip should be from 1000 feet to 0.5 mile wide. Most of the alternate hosts are, however, abundant and persistent, and some have light seeds which enable them to quickly reinvade an area from which they have been eradicated. Consequently, control of the alternate hosts, in most cases, is not economically feasible.

Where blister rusts occur around pine nurseries, the alternates hosts should be eradicated for a distance of 0.5 mile. Infected pines surrounding the nursery should be cut out for a distance of several hundred yards to reduce the spread of infection to the alternate hosts. Infected stock should be destroyed. It is sound practice not to establish nurseries in blister rust prevalent areas.

White pine blister rust is caused by *Cronartium ribicola* Fischer. This fungus attacks and destroys the majority of the 5-needle pines throughout the world and is well established throughout most of the range of eastern and western white pine in this country. *Cronartium ribicola* on Ribes and *Peridermium strobi* on eastern white pine are stages of the same fungus. Where the rust fungus forms a peridium during aecial spore stage, but alternate host stages are not known, the fungus is classified in genus Peridermium. When alternate host stages are not known, and the fungus does not form a peridium, then the fungus is classified in genus Caeoma.

White pine blister rust is a very destructive disease and it has spread relentlessly over the years. In the East, it is now present from Maine to South Carolina and westward to Minnesota. In the west, the disease is found throughout the Northwest white pine regions, eastward to Wyoming and southward into the valuable California sugar pine areas. The fungus forms spindle-shaped stem swellings.

Pine hosts (probably attacks majority of 5-needle pine species throughout the world):
    Eastern white pine, *Pinus strobus*
    Western white pine, *Pinus monticola*
    Sugar pine, *Pinus lambertiana*
    Whitebark pine, *Pinus albicaulis*
    Limber pine, *Pinus flexilis*
    Swiss stone pine, *Pinus cembra*
    Bristlecone pine,[1] *Pinus aristata*
    Mexican white pine,[1] *Pinus ayacahuite*

Most Ribes species (currants and gooseberries) in North America and Europe, native and cultivated, are susceptible.

Southern fusiform rust is caused by *Cronartium fusiforme* (A & K) Hedgc. and Hunt. The fungus is limited to the Southern States where it attacks a number of the valuable hard yellow pines. The fungus growth causes pronounced spindle-shaped (fusiform) swellings of the pine stems, sometimes accompanied by witches'-brooms.

Pine hosts:
    Slash pine, *Pinus caribaea*
    Loblolly pine, *Pinus taeda*
    Longleaf pine, *Pinus palustris*
Alternate hosts: Oak species Eastern gall rust (pine-oak rust) is caused by *Cronartium cerebrum* Hedgc. and Long. The fungus ranges eastward from the Great Plains Region in the United States and Canada attacking many hard pine species. The disease is also abundant in the Southern States. The fungus growth causes the development of globose or subglobose galls on the pine stems. This rust some- ---
[1] Susceptible but rust not reported to date.

times causes severe damage in nurseries with infection running as high as 50% in certain years. It also causes severe damage in young trees.

Pine hosts:
    Jack pine, *Pinus banksiana*
    Virginia (scrub) pine, *Pinus virginiana*
    Shortleaf pine, *Pinus echinata*
Alternate hosts: Oak species Western gall rust (woodgate gall rust) is widespread throughout the West on hard pines, attacks Scotch pine in the East, Jack pine in Canada and some southern pine, and is caused by more than one species or possibly different strains of a single species. The rusts on Jeffrey, ponderosa, lodgepole and digger pines are considered to be caused by the fungus *Cronartium harknessii* (Moore) Meinecke. The rusts on Monterery and knobcone pines are thought to be caused by *Peridermium cerebroides*. One investigator considers both fungi to be strains of *Cronartium coleosporioides*. Western gall rust is very destructive, especially to seedlings, and saplings, killing some trees and stunting and malforming many others. The fungus growth causes the formation of stem galls, and witches'-brooms often form just above the galls. The control of this disease is difficult because infection occurs directly from pine to pine, as well as from the alternate hosts.

Pine hosts:
    Jeffrey pine, *Pinus jeffreyi*
    Ponderosa pine, *Pinus ponderosa*
    Lodgepole pine, *Pinus contorta*
    Digger pine, *Pinus sabiniana*
    Monterery pine, *Pinus radiata*
    Knobcone pine, *Pinus attenuata*
    Jack pine, *Pinus banksiana*
    Scotch pine, *Pinus sylvestris*
    Loblolly pine, *Pinus taeda*
    Slash pine, *Pinus caribaea*
Alternate hosts:
    Paintbrush
    Lousewort
    Owl's clover
    Bird's beak Paintbrush blister rust (stalactiform rust) is caused by *Cronartium filamentosum* (Peck) Hedgc. (considered by some to be a strain of *C. coleosporioides*) and occurs in the West and also in Eastern Canada. The rust is quite destructive, especially to seedlings and saplings. The fungus causes the formation of slight spindle-shaped swellings on the twigs and branches and canker areas on the trunk.

Pine hosts:
    Lodgepole pine, *Pinus contorta*
    Pondersoa pine, *Pinus ponderosa*
    Jack pine, *Pinus banksiana*
    Jeffrey pine, *Pinus jeffreyi*
    Swiss mountain pine, *Pinus mugo*
Alternate hosts:
    Paintbrush
    Lousewort
    Owl's clover
    Bird's beak Camandra blister rust is caused by the fungus *Cronartarium comandrae* Peck and is widely distributed in the East and West. The rust forms spindle-shaped stem swelings although occasionally, globose swellings occur.

Pine hosts:
    Ponderosa pine, *Pinus ponderosa*
    Arizona pine, *Pinus ponderosa* var. *arizonica*
    Lodgepole pine, *Pinus contorta*
    Pitch pine, *Pinus rigida*
    Mountain pine, *Pinus pungens*
    Jack pine, *Pinus banksiana*
    Loblally pine, *Pinus taeda*
    Austrian pine, *Pinus nigra* ssp. *nigra*
    Scotch pine, *Pinus sylvestris*
    Maritime pine, *Pinus pinaster*
Alternate hosts: Bastard toad flax (Comandra spp.)

Sweetfern blister rust is caused by the fungus *Cronartium comptonia* Atrh. (Spaulding and Hansbrough, 1932). The rust ranges from Nova Scotia west to Saskatchewan and south to North Carolina and Missouri. It also is found on the west coast of North America. Fusiform swellings are characteristic of this fungus and in general, the trees are damaged by the girdling action. Although the disease is not serious in older trees, young seedlings and saplings are usually killed by the gardling action.

Pine hosts:
    Lodgepole pine, *Pinus contorta*
    Ponderosa pine, *Pinus ponderosa*
    Jack pine, *Pinus banksiana*
    Loblolly pine, *Pinus taeda*
Alternate hosts:
    Sweetfern
    Sweetgale Pinon blister rust is caused by the fungus *Cronartium occidentale* Hedgcock, Bethel and Hunt. The rust is found throughout the west and the disease is prevalent in Arizona, California, Colorado and Nevada.

Pine hosts:
    Pinon pine, *Pinus cembroides*
    Single leaf pine, *Pinus monophylla*
Alternate hosts: Currants and gooseberries (Ribes sp.)

The cones of a few conifers are attacked by rusts resulting in serious reductions in the amount of seed produced. In some years, 25 to 90 percent of the cone crop is destroyed. These diseases are serious in the southern Gulf Coast area and in Arizona and New Mexico.

*Cronartium strobilinum* (Arth.) Hedgc. and Hahn, is prevalent in the Gulf Coast area and is serious in the areas where slash and longleaf southern pine are grown. The organism is unique in that pycnia are formed the same season as the aecia.

Pine hosts:
    Slash pine, *Pinus caribaea*
    Longleaf pine, *Pinus palustris*
Alternate hosts: Oaks

*Cronartium conigenum* (Pat.) Hedgc. and Hunt, is prevalent in the Southwest where it infects the cones of the Chihuahua pine.

Pine hosts: Chihuahua pine, *Pinus leiphylla*
Alternate hosts: Emory and whiteleaf oaks The characteristics of the antifungals Phytoactin and Phytostreptin which are employed in the invention, and their production by fermentation are described in my copending applications with Bennett, Cairney and Chow, Phytoactin and Production Thereof, Serial No. 7,064, filed February 5, 1960, now U.S. Patent 3,032,471, and Phytostreptin and Production Thereof, Serial No. 6,979, filed February 5, 1960, now U.S. Patent 3,032,470, respectively, the disclosures of which are incorporated herein by reference to avoid excessive repetition. These applications are continuations-in-part of, respectively, the patent applications Serial No. 628,769, filed December 17, 1956, and Serial No. 659,818, filed May 17, 1957, both now abandoned. The antifungals and their production are also characterized in the following description.

PHYTOACTIN

Phytoactin is a polypeptide having no terminal free amino group as indicated below by its chemical and physical properties. It is a very light tan solid and is soluble in methanol, ethanol, isopropanol, n-butanol, chloroform, acetone, methylisobutyl ketone, dioxane, tetrahydrofuran, formamide, ethylene chloride and 1 N NaOH. It is insoluble in petroleum ether (30–60° C.), benzene, and ethyl acetate, and slightly soluble in dethyl ether, 1 N HCl, and water.

Phytoactin gives a positive permanganate test, and negative anthrone, ferric chloride, Molisch and ninhydrin tests. It gives no color with cold concentrated sulfuric acid. It is precipitated from aqueous methanol solutions by ammonium sulfate, calcium chloride, cupric chloride, lead acetate, mercuric chloride, sodium chloride, zinc chloride, picric acid, salicyclic acid, phosphotungstic acid, trichloroacetic acid, methyl orange and reinecke salt.

Phytoactin also gives a positive biuret test, and negative Millon, Liebermann Buchard, maltol, Pauly, Ehrlich (dimethylaminobenzaldehyde), and Sakaguchi tests.

The polypeptide nature of this antibiotic was revealed by hydrolysis with 6 N HCl. The hydrolysate, now ninhydrin positive, was analyzed using two dimensional paper chromatographic techniques. The presence of at least eight ninhydrin-positive components was detected, of which the amino acids valine, alpha-alanine, proline, leucine (or insoleucine), arginine, glycine and serine were identified.

Phytoactin (methanol solution) is heat stable, unchanged after heating for 7 days at 40° C. or for 3 hours at 65° C. It is dialyzable through a cellophane membrane (30% aqueous methanol). It is not digested by pepsin, trypsin, Pabst purified *Bacillus subtilis* bacterial protease or Pabst purified *Aspergillus oryzae* fungal protease. Phytoactin exhibits strong end absorption in the lower regions of the ultra-violet with no significant maxima in the region 230–410 m$\mu$. Determinations were made in methanol (100 $\mu$g./ml.) with a Beckman DU spectrophotometer.

Phytoactin shows a number of characteristic absorption bands in the infrared region when dissolved in chloroform, the more significant of which are at the following frequencies (expressed in microns): 2.92, 3.04, 3.38, 3.43, 3.48, 5.72, 6.03, 6.54, 6.87, 7.06, 7.23, 7.56, 7.72, 7.80, 8.05, 8.24, 8.68, 9.39, 9.43, 10.07, 10.30, 10.72, 10.80 and 11.00. The spectrum was obtained on a Perkin-Elmer Model 21, doublebeam infrared spectrophotometer, Serial No. 760 (gain 5.0, response 1.0, speed 5.0, suppression 3.0).

In order to eliminate the absorption of the chloroform solvent, the infrared absorption spectrum of Phytoactin was also obtained in a potassium bromide pellet, on a Baird Model 455 I.R. spectrophotometer. There is relatively little change from the determination in chloroform solution. Phytoactin shows strong absorption bands at the following positions characteristic of the peptide bond, expressed in microns and parenthetically in wave numbers in reciprocal centimeters: 2.77–3.07 (3600–3250), 3.33–3.42 (3000–2925), 5.87–6.24 (1700–1600), and 6.42–6.70 (1560–1490). Other significant absorption bands are shown at 6.0–6.07 (1670–1640), 6.83–6.90 (1470–1450), 7.20–7.35 (1390–1360), 7.57–7.93 (1320–1260), and 9.25–9.43 (1080–1060) (very weak).

Phytoactin is optically active; laevo rotatory, $(\alpha)_D^{25}$ —86° (c.=1, methanol). The following electrometric titration data were obtained (titration started from acid range):

| Solvent | pK | Equivalent weight, grams/mole | Remarks |
| --- | --- | --- | --- |
| Water | 2.4 | 400–500 | No free amino group. |
| 70% methanol | 3.4 | 3,000 | Do. |

Phytoactin exhibits an indefinite melting point, commencing at about 150° C. and melting with apparent decomposition. Melting ranges were determined in a sealed capillary in an oil bath, as follows: 154–162° C., 148–168° C., and 148–171° C.

Elemental analysis of Phytoactin gave the following values:

| C | H | N |
| --- | --- | --- |
| 56.48 | 8.28 | 12.46 |
| 56.71 | 8.23 | 12.24 |
| 57.12 | 8.11 | 12.57 |
| 57.14 | 8.34 | 12.57 |
| [1] 56.86 | [1] 8.25 | [1] 12.46 |

[1] Average.

Amide nitrogen was found to be 0.9%. Sulfur and halogen are absent.

The molecular weight of Phytoactin has been determined to be 46,000 (plus or minus 10%) by the Ehrenberg modification of the Archibald method for the approach to sedimentation equilibrium. Two ultracentrifuge determinations were made, in pH 7.2, 0.01 molar "tris" buffer with 0.05 molar NaCl added as a supporting electrolyte. Phytoactin obtained as described herein satisfied the first criterion for ultracentrifugal homogeneity in "velocity ultracentrifuge" experiments. The material gave only one sedimenting boundary, which remained symmetrical throughout the experiments.

Phytoactin was examined by one-dimensional paper chromatography using Whatman No. 1 paper and the solvent systems indicated in Table I. The developed chromatograms were air dried at room temperature and bioautographed on agar plates seeded with *Glomerella cingulata*.

*Table I.—Chromatographic Data for Phytoactin*

| System | $R_f$ | Remarks | Running time, hrs. |
| --- | --- | --- | --- |
| Water saturated n-butanol | 0.96 | Well defined spot | 16 |
| n-Butanol-acetic acid-water (2-1-1) | 0.94 | do | 16 |
| n-Butanol-pyridine-water (1-0.6-1) | 0.97 | do | 16 |
| 3% aqueous ammonium chloride | 0.02 | do | 4 |
| 50% aqueous acetone | {0.52 / 0.94} | Tailing / Well defined spot | 6 |
| Benzene-acetic acid-water (2-2-1, organic phase) | 0.18 | Tailing | 16 |
| Tert. butanol-acetic acid-water (74-3-25) | 0.89 | Well defined spot | 28 |

The chromatographic data for Phytoactin is consistent with the unusual solubility of this polypeptide compound in such fat-solvents as acetone, methylisobutylketone, and chloroform.

Phytoactin is particularly effective against fungi. It also has antibacterial properties. Its in vitro spectrum against a number of fungi and bacteria is shown in Table II. These tests were run in slant tubes using agar media containing various concentrations of the antibiotic in the range of 0.01 to 197 micrograms per ml. Potato dextrose agar was used for all of the fungal cultures. Penassay seed agar was used for *Candida albicans* and the bacterial cultures. Sabouraud maltose agar was used for the dermatophytes *Epidermophyton floccosum*, *Microsporum gypseum*, and *Trichophyton mentagrophytes*. The agar media were inoculated with the respective test organism and incubated at 28° C., until the control tube, containing no antibiotic, showed good growth (approximately 2–4 days for the fungal cultures and 1 day for *C. albicans* and the bacterial cultures). The inhibiting concentration of Phytoactin for each of these organisms was then noted. The incubation period was then continued for four days and two additional inhibition readings made; at two days and four days respectively (after the initial reading). One culture, *Endoconidiophora fagacearum* (*Ceratocystis fagacearum*), the causative agent of oak wilt, was incubated for an additional four week period with no change in the inhibitory level of Phytoactin (0.3 $\mu$g. per ml.). Attempts to isolate

*E. fagacearum* (*C. fagacearum*) from the inhibited levels were unsuccessful. Another culture, *Ceratostomella ulmi* (*Ceratocystis ulmi*), the causative agent of Dutch elm disease, was also incubated for an additional four week period with no change in the inhibiting level of Phytoactin (0.8 μg. per ml.). Attempts to isolate *C. ulmi* from the inhibited levels were unsuccessful.

*Table II.—In Vitro Antimicrobial Spectrum of Phytoactin*

| Culture | Culture inhibited at indicated concentration (μg./ml.) | | |
|---|---|---|---|
| | After initial growth [1] | 2 days later | 4 days later |
| *Alternaria dianthi* | 0.8 | 2.4 | 7.3 |
| *Alternaria solani* | 0.8 | 0.8 | 0.8 |
| *Botrytis gladiolorum* | 2.4 | 2.4 | 2.4 |
| *Botrytis cinerea* | 0.8 | 2.4 | 2.4 |
| *Ceratostomella ulmi* (*Ceratocystis ulmi*) | 0.8 | 0.8 | 0.8 |
| *Colletotrichum circinans* | 0.8 | 0.8 | 0.8 |
| *Diplodia zeae* | 0.8 | 2.4 | 7.3 |
| *Endoconidiophora fagacearum* (*Ceratocystis fagacearum*) | 0.3 | 0.3 | 0.3 |
| *Endoconidiophora fimbriata* (*Ceratocystis fimbriata*) | 0.8 | 0.8 | 0.8 |
| *Endothia parasitica* | 0.8 | 0.8 | 2.4 |
| *Fusarium oxy.* f. *dianthi* 5A | 2.4 | [2] 2.4-197 | [2] 2.4-197 |
| *Fusarium oxy.* f. *gladioli* | 0.8 | 7.3 | [2] 2.4-197 |
| *Fusarium roseum* | 2.4 | 7.3 | 7.3 |
| *Gibberella zeae* | 7.3 | [2] 22-197 | [3] >197 |
| *Glomerella cingulata* | 0.3 | 0.8 | 0.8 |
| *Helminthosporium sativum* | 0.8 | 0.8 | 0.8 |
| *Helminthosporium victoria* | 0.8 | 0.8 | 0.8 |
| *Macrophominia phaseoli* | 2.4 | 2.4 | 2.4 |
| *Phytophthora cinnamomi* | 7.3 | [2] 22-197 | [2] 22-197 |
| *Pythium* sp. No. 389 | 2.4 | 22 | 22 |
| *Rhizoctonia solani* | 2.4 | 2.4 | 2.4 |
| *Sclerotina fructicola* | 0.8 | 0.8 | 0.8 |
| *Ustilago sphaerogena* | 2.4 | 2.4 | 2.4 |
| *Verticillium albo-atrum* | 0.8 | 2.4 | 2.4 |
| *Candida albicans* | 2.4 | 2.4 | 2.4 |
| *Epidermophyton floccosum* | 0.8 | 0.8 | 2.4 |
| *Microsporum gypseum* | 2.4 | 2.4 | 2.4 |
| *Trichophyton mentagrophytes* | 0.8 | 0.8 | 0.8 |
| *Bacillus cereus* | 7.3 | 22 | 22 |
| *Bacillus cereus* var. *mycoides* | 7.3 | 22 | 22 |
| *Bacillus megatherium* | 7.3 | 7.3 | 7.3 |
| *Bacillus subtilis* | 22 | 22 | 22 |
| *Escherichia coli* | [3] >197 | >197 | >197 |
| *Micrococcus flavus* | 2.4 | 2.4 | 2.4 |
| *Micrococcus pyogenes* bar. *aureus* | 7.3 | 22 | 22 |
| *Mycobacterium tuberculosis* No. 607 | [3] >197 | >197 | >197 |
| *Sarcina lutea* | 7.3 | 22 | 22 |

[1] Inhibition reading made when control tube shows good growth—usually 2–4 days.
[2] Partial inhibition of culture.
[3] No inhibition at this level.

Phytoactin has been shown in greenhouse studies to be an effective fungicide for the control of plant diseases such as tomato early blight, tomato late blight, bean rust and wheat leaf rust. These diseases are caused respectively by *Alternaria solani* (Ell. and Mort.) Jones and Grout, *Phytophthora infestans* (Mont.) de Bary, *Uromyces phaseoli* (Pers.) Wint. and *Puccinia rubigo-vera* (DC.) Wint.

Phytoactin is formed during cultivation of a microorganism of the family Stereptomycetaceae, specifically, a train of the species *Streptomyces hygroscopicus*. A culture of a microorganism strain which was isolated from domestic United States soil and produces phytoactin has been deposited in the culture collection of the United States Department of Agriculture, Agricultural Research, Northern Utilization Research and Development Division, Peoria, Illinois, and the culture has been assigned the number NRRL 2752 in the culture collection. The strain is referred to herein as *Streptomyces hygroscopicus* NRRL 2752, or for brevity, NRRL 2752. The characteristics of this organism are as set forth in the following description.

*STREPTOMYCES HYGROSCOPICUS* NRRL 2752

The organism NRRL 2752 produces spiral sporophores and the slightly oval to spheroical spores measure 1–1.5 microns in diameter. The growth characteristics of the organism were observed following incubation on the diagnostic media indicated below for 23 days at 28° C., and any modifications in growth characteristics which occurred after 23 days and up to 44 days at 28° C. were noted. The following growth characteristics were observed, the aerial mycelium colors being described according to Ridgeway, Color Standards and Color Nomenclature (Washington, D.C., 1912).

Asparagine-glucose-meat extract agar: Excellent growth with pallid neutral to pale neutral grey aerial mycelium. Black areas forming after 14 days, becoming moist after 30 days. Light yellow brown reverse and light brown soluble pigment.

Bennett's agar: Excellent growth with colorless moist vegetative mycelium. Light yellow-brown reverse and light brown soluble pigment.

Corn steep liquor agar (Waksman): Moderate growth with colorless moist vegetative mycelium. Light yellow-brown reverse with fairly strong brown soluble pigment.

Szapek agar (Difco): Excellent growth with pallid to neutral grey aerial mycelium. Black areas forming after 23 days, not becoming moist after 44 days. Light yellow reverse and light brown soluble pigment.

Gelatin (Waksman): Not liquefied after 9 days; liquefied after 16 days.

Litmus milk: White ring of growth with slight coagulation. 25% peptonization after 7 days, 60% after 14 days, 70% after 23 days, 90% after 30 days and 100% after 44 days. Milk pH 6.55 after 23 days.

Nitrate broth (Difco): Reduced.

Oatmeal-yeast extract agar: Moderate growth with pallid mouse to light mouse grey aerial mycelium. Black areas forming after 23 days becoming moist after 30 days.

Potato dextrose agar: Excellent growth with pallid neutral to light neutral grey aerial mycelium. Black areas forming after 30 days, not becoming moist after 44 days. Yellow reverse and light brown soluble pigment.

Potato plug: Poor growth with brownish vegetative mycelium. White to light grey on drying tip.

Starch agar (Difco): Moderate growth with pallid mouse grey aerial mycelium. Black areas forming after 14 days, becoming moist after 23 days. Light yellow-brown reverse and light brown soluble pigment.

Yeast extract agar (Waksman): Excellent growth with colorless vegetative mycelium and few white areas. Light yellow-brown reverse and light brown soluble pigment.

The above results included the dark areas characteristic of *S. hygroscopicus*, which were exhibited on asparagine-glucos-meat extract agar, Czapek agar, oatmeal-yeast extract agar, potato dextrose agar, and starch agar. The organism also produced the characteristic grey-colored aerial mycelium on a number of the media, and the characteristic compact spore-bearing hyphae were produced on agar media such as asparagine-glucose-meat extract agar, potato dextrose agar, and oatmeal-yeast extract agar.

PHYTOSTREPTIN

Phytostreptin is a polypeptide having an apparent free amino group as indicated below by its chemical and physical properties. It is a very light tan solid and is soluble in water, 1 N sodium hydroxide (forms gel on standing), methanol, ethanol, isopropanol, n-butanol, chloroform, acetone, methylisobutyl ketone, dioxane, tetrahydrofuran, formamide, and ethylene chloride. It is slightly soluble in diethyl ether and 1 N HCl, and insoluble in petroleum ether (30°–60° C.), benzene, and ethyl acetate.

Phytostreptin gives positive permanganate and biuret tests and negative anthrone, ferric chloride, Molisch, ninhydrin, Millon, Liebermann Buchard, maltol, Pauly, Ehrlich (dimethylaminobenzaldehyde), Sakaguchi and Fehling tests. It gives no color with cold concentrated sulfuric acid. It is precipitated from aqueous solution by ammonium sulfate, calcium chloride, barium chloride, cupric chloride, sodium chloride, zinc chloride, picric acid, phosphotungstic acid, trichloroacetic acid, methyl orange and reinecke salt.

The polypeptide nature of this antibiotic was revealed by hydrolysis with 6 N HCl. The hydrolysate, now ninhydrin positive, was analyzed using two dimensional paper chromatographic techniques. The presence of at least eight ninhydrin-positive components was detected, of which the amino acids valine, alpha-alanine, proline, leucine (or isoleucine), arginine, glycine and serine were identified.

Phytostreptin is heat stable; no loss of activity occurred when a methanol solution was refluxed (65° C.) for 6 hours or when 30% aqueous methanol solutions, adjusted to pH 3, 7 and 10, were heated at 85° C. for 30 minutes. It is dialyzable through a cellophane membrane (aqueous solution). It is not digested by pepsin, trypsin, Pabst purified *Bacillus subtilis* bacterial protease or Pabst purified *Aspergillus oryzae* fungal protease.

Phytostreptin exhibits strong end absorption in the lower regions of the ultraviolet with no significant maxima in the region 230–410 m$\mu$. Determinations were made in methanol (100$\mu$g./ml.) with a Beckman DU spectrophotometer.

Phytostreptin shows a number of characteristic absorption bands in the infrared region when dissolved in chloroform, the more significant of which are at the following frequencies (expressed in microns): 2.93, 3.08, 3.20, 3.33, 3.45, 3.52, 4.12, 5.71, 5.74, 6.05, 6.15, 6.56, 6.70, 6.95, 7.12, 7.60, 7.76, 7.86, 8.12, 8.86, 9.05, 9.42, 10.06, 10.34, 10.80, 11.00, 11.46, 11.70 and 13.30. The spectrum was obtained on a Perkin-Elmer Model 21, double-beam infrared spectrophotometer, Serial No. 760 (gain 5.0, response 1.0, speed 6.0 and supression 3.0).

In order to eliminate the absorption of the chloroform solvent, the infrared absorption spectrum of phytostreptin was also obtained in a potassium bromide pellet, on a Baird Model 455 I.R. spectrophotometer. There is relatively little change from the determination in chloroform solution. Phytostreptin shows strong absorption bands at the following positions characteristic of the peptide bond, expressed in microns and parenthetically in wave numbers in reciprocal centimeters: 2.77–3.07 (3600–3250), 3.33–3.42 (3000–2925), 5.87–6.24 (1700–1600), and 6.42–6.70 (1560–1490). Other significant absorption bands are shown at: 6.0–6.07 (1670–1640), 6.83–6.90 (1470–1450), 7.20–7.35 (1390–1360) (shoulder), 7.57–7.63 (1320–1260), and 8.77–9.43 (1140–1060).

Phytostreptin is optically active; laevo rotatory $(\alpha)_D^{26}$ −81° (c.=1, methanol). The following electrometric titration data were obtained (titration started from acid range):

| Solvent | pK | Equivalent weight, grams/mole | Remarks |
|---|---|---|---|
| Water | 2.4 | 1,000 | Apparent free carboxyl group. |
| | 9.6 | 3,500 | Apparent free amino group. |
| 70% methanol | 3.4 | 3,300 | Apparent free carboxyl group. |
| | 9.4 | 3,300 | Apparent free amino group. |

Phytostreptin exhibits an indefinite melting point, commencing at about 165° C. and melting with apparent decomposition. Melting ranges were determined in a sealed capillary in an oil bath, as follows: 168–178° C., 166–172° C., and 166–173° C.

Elemental analysis of Phytostreptin gave the following values:

| C | H | N |
|---|---|---|
| 52.56 | 7.93 | 13.53 |
| 52.44 | 7.66 | 13.26 |
| 53.70 | 8.44 | 13.38 |
| 53.45 | 8.29 | 13.48 |
| [1] 53.04 | [1] 8.03 | [1] 13.41 |

[1] Averages.

Amide nitrogen was found to be 1.5%. Sulfur and halogen are absent.

The molecular weight of Phytostreptin has been determined to be 28,600 (plus or minus 10%) by the Ehrenberg modification of the Archibald method for the approach to sedimentation equilibrium. Two ultracentrifuge determinations were made in pH 7.2, 0.01 molar "tris" buffer with 0.05 molar NaCl added as a supporting electrolyte. Phytostreptin obtained as described herein satisfied the first criterion for ultracentrifugal homogeneity in "velocity ultracentrifuge" experiments. The material gave only one sedimenting boundary, which remained symmetrical throughout the experiments.

Phytostreptin was examined by ascending one-dimensional paper chromatography using Whatman No. 1 paper and the solvent systems indicated in Table III. The developed chromatograms were air dried at room temperature and bioautographed on agar plates seeded with *Glomerella cingulata*.

Table III.—*Chromatographic Data for Phytostreptin*

| System | R$_f$ | Remarks | Running time, hours |
|---|---|---|---|
| Water saturated with n-butanol | 0.00 | Well defined spot | 7 |
| n-Butanol saturated with water | 0.91 | do | 16 |
| n-Butanol-acetic acid-water (2-1-1) | 0.93 | do | 16 |
| n-Butanol-pyridine-water (1-0.7-1) | 0.92 | do | 16 |
| 3% aqueous ammonium chloride | 0.00 | do | 4 |
| 50% aqueous acetone | 0.53 | Tailing | 6 |
| | 0.93 | Well defined spot | |
| Tert. butanol-acetic acid-water (74-3-25) | 0.91 | Well defined spot | 28 |
| n-Butanol-methanol-water (4-1-2) | 0.98 | do | 8 |
| Benzene-methanol (4-1) | 0.98 | do | 5 |

The chromatographic data for Phytostreptin is consistent with the unusual solubility of this polypeptide compound in such fat solvents as acetone, methylisobutylketone, and chloroform.

Phytostreptin forms alkali metal salts such as the sodium salt with alkali metal bases, and other simple and complex salts of Phytostreptin can readily be prepared. Phytostreptin salts include the copper, zinc and manganese salts, and the molybdate, picrate, helianthate and reineckate complex salts. These salts are slightly soluble or soluble in water, 1 N sodium hydroxide, and chloroform. They are slightly soluble in 1 N HCl, and soluble in methanol and acetone. The salts are active against the test organism *Glomerella cingulata*.

Phytostreptin is particularly effective against fungi. It also has antibacterial properties. Its in vitro spectrum against a number of fungi and bacteria is shown in Table IV. In addition, in a paper disc-agar plate assay test using potato dextrose agar, Phytostreptin developed zones of inhibition against *Ceratostomella ulmi* (*Ceratocystis ulmi*), the causative agent of Dutch elm disease, at about 40 micrograms per milliliters.

The tests reported in Table IV were made in agar slant tubes using agar media containing various concentrations of Phytostreptin in the range of 0.01 to 197 micrograms per ml. The same procedures were used as previously described for Phytoactin in connection with Table II. One culture, *Endoconidiophora fagacearum* (*Ceratocystis*

*fagacearum*), the caustive agent of oak wilt, was incubated for an additional four week period with no change in the inhibitory level of Phytostreptin (0.3 microgram (μg.) per milliliter). Attempts to isolate *E. fagacearum* (*C. fagacearum*) from the inhibited levels were unsuccessful.

Table IV.—In Vitro Antimicrobial Spectrum of Phytostreptin

| Culture | Culture inhibited at indicated concentration (μg./ml.) | | |
|---|---|---|---|
| | After initial growth[1] | 2 days later | 4 days later |
| Alternaria dianthi | 2.4 | 2.4 | 2.4 |
| Alternaria solani | 0.8 | 0.8 | 0.8 |
| Botrytis gladiolorum | 0.8 | 0.8 | 2.4 |
| Botrytis cinerea | 2.4 | 2.4 | 2.4 |
| Colletotrichum circinans | 0.8 | 2.4 | 2.4 |
| Diplodia zeae | 2.4 | 2.4 | 2.4 |
| Endoconidiophora fagacearum (Ceratocystis fagacearum) | 0.3 | 0.3 | 0.3 |
| Endoconidiophora fimbriata (Ceratocystis fimbriata) | 0.8 | 0.8 | 0.8 |
| Endothia parasitica | 0.8 | 2.4 | 2.4 |
| Fusarium oxy. f. dianthi 5A | 7.3 | [2]7.3–197 | [2]7.3–197 |
| Fusarium oxy. f. gladioli | 2.4 | [2]2.4–197 | [2]2.4–197 |
| Fusarium roseum | 2.4 | 7.3 | 22 |
| Gibberella zeae | 7.3 | [2]7.3–197 | [2]22–197 |
| Glomerella cingulata | 0.3 | 0.8 | 2.4 |
| Helminthosporium sativum | 0.8 | 2.4 | 2.4 |
| Helminthosporium victoria | 0.8 | 0.8 | 0.8 |
| Macrophominia phaseoli | 2.4 | 2.4 | 2.4 |
| Phytophthora cinnamomi | 7.3 | [2]7.3–197 | [2]7.3–197 |
| Pythium sp. No. 389 | 7.3 | 22 | 22 |
| Sclerotinia fructicola | 0.8 | 0.8 | 2.4 |
| Rhizoctonia solani | 2.4 | 2.4 | [2]2.4–197 |
| Verticillium albo-atrum | 0.8 | 2.4 | 2.4 |
| Candida albicans | 2.4 | 2.4 | 2.4 |
| Epidermophyton floccosum | 0.8 | 0.8 | 2.4 |
| Microsporum gypseum | 2.4 | 2.4 | 2.4 |
| Trichophyton mentagrophytes | 0.8 | 2.4 | 2.4 |
| Bacillus cereus | 7.3 | 22 | 22 |
| Bacillus cereus var. mycoides | 7.3 | 22 | 22 |
| Bacillus megatherium | 7.3 | 7.3 | 7.3 |
| Bacillus subtilis | 7.3 | 22 | 22 |
| Escherichia coli | [3]>197 | >197 | >197 |
| Micrococcus flavus | 0.3 | 2.4 | 2.4 |
| Micrococcus pyogenes var. aureus | 2.4 | 7.3 | 7.3 |
| Mycobacterium tuberculosis No. 607 | [3]>197 | >197 | >197 |
| Sarcina lutea | 2.4 | 2.4 | 2.4 |

[1] Inhibition readings made when control tube showed good growth—usually 1–4 days.
[2] Partial inhibition of culture.
[3] No inhibition at this level.

Pytostreptin and the above simple and complex salts have been shown in greenhouse studies to be an effective fungicide for the control of plant diseases such as tomato early blight, tomato late blight, and bean rust. These diseases are caused respectively by *Alternaria solani* (Ell. and Mort.) Jones and Grout, *Phytophthora infestans* (Mont.) de Bary, and *Uromcyes phaseoli* (Pers.) Wint.

Phytoactin and Phytostreptin closely resemble each other in their characteristics and properties, yet they are readily distinguished by their properties of water solubility, elemental analysis, molecular weight, percent of amide nitrogen, infrared spectrum, and electrometric titration. Both of the antifungals are clearly distinct from the other antifungal antibacterial antibiotics previously reported.

Phytostreptin is likewise produced by cultivation of a member of the family Streptomycetaceae, specifically, a strain of the species *Streptomyces hygroscopicus*. A culture of a strain of a microorganism which was isolated from domestic United States soil and which produces Phytostreptin has been deposited in the above culture collection and assigned the number NRRL 2751. The characteristics of the strain NRRL 2751 closely resemble those of the strain NRRL 2752. There are, however, morphological and biochemical characteristics that distinguish the two microorganisms, notably, a marked difference in the rate of peptonization of milk. Darker aerial mycelium are also formed by NRRL 2752 on a number of media. A description of the organism NRRL 2751 follows:

*STREPTOMYCES HYGROSCOPICUS* NRRL 2751

The organism NRRL 2751 produces spiral sporophores and the slightly oval to spherical spores measure 1–1.3 microns in diameter. The growth characteristics of the organism were observed following incubation on the media indicated for 23 days at 28° C., and any modifications in growth characteristics which occurred after 23 days and up to 44 days at 28° C. were noted. The following growth characteristics were observed, the aerial mycelium colors described according to Ridgeway, supra.

Asparagine-glucose-meat extract agar: Excellent growth with neutral grey aerial mycelium. Light yellow-brown reverse and light brown soluble pigment.

Bennett's agar: Excellent growth with colorless dry vegetative mycelium. Light yellow-brown reverse and light brown soluble pigment.

Corn steep liquor agar (Waksman): Excellent growth with colorless, dry (moist after 7 days), wrinkled vegetative mycelium. Sparse white aerial mycelium forming after 30 days. Light yellow-brown reverse with fairly strong brown soluble pigment.

Czapek agar (Difco): Excellent growth with pallid to pale neutral grey aerial mycelium. Black areas forming after 30 days, not becoming moist after 44 days. Light yellow reverse and light brown soluble pigment.

Gelatin (Waksman): Liquefied after 9 days.

Litmus milk: Colorless to white ring of growth with no coagulation. No peptonization after 7 days, 100% after 14 days. Milk pH 6.6 after 23 days.

Nitrate broth (Difco): Reduced.

Oatmeal-yeast extract agar: Excellent growth with neutral grey aerial mycelium. Black areas forming after 30 days, not becoming moist after 44 days.

Potato dextrose agar: Excellent growth with light neutral to neutral grey aerial mycelium. Yellow-brown reverse and light brown soluble pigment.

Potato plug: Poor growth with colorless vegetative mycelium. White to light grey on drying tip. Black areas forming in butt after 44 days.

Starch agar (Difco): Excellent growth with mouse grey aerial mycelium. Light yellow-brown reverse and faint brown soluble pigment.

Yeast extract agar (Waksman): Excellent growth with pale smoke grey aerial mycelium. Dark grey areas forming after 30 days, not becoming moist after 44 days. Light yellow-brown reverse and light brown soluble pigment.

The above results included the dark areas characteristic of *S. hygroscopicus*, which were exhibited on Czapek agar, oatmeal-yeast extract agar, potato plug, and yeast extract agar. In addition, the organism showed moist black areas on year-old refrigerated starch agar slants. The organism also produced the characteristic grey-colored aerial mycelium on a number of the media, and the characteristic compact spore-bearing hyphae were produced on agar media such as asparagine-glucose-meat extract agar, potato dextrose agar, and oatmeal-yeast extract agar.

PRODUCTION OF ANTIFUNGALS BY FERMENTATION

The antifungals are produced by fermenting a nutrient medium with a Phytoactin or Phytostreptin producing microorganism such as *Streptomyces hygroscopicus* NRRL 2752 or 2751, respectively. Preferably, an aqueous nutrient medium is fermented under submerged, aerobic and agitated conditions until substantial antifungal activity is produced. The antifungals may be routinely determined by the agar plate assay method, using *Glomerella cingulata* or *Candida albicans* as the test organism.

Nutrient media which are suitable for the production of the antifungal include a suitable source of assimilable carbon, preferably a carbohydrate source such as glucose, a source of assimilable nitrogen such as soya flour, corn steep liquor, yeast and the like, and mineral salts, which may be present with the other ingredients, such as corn steep liquor. Inoculum of the organism is prepared by growing it on agar slant media such as oatmeal or peptone-yeast extract. These agar slant cultures can then be used to prepare larger amounts of inoculum by seeding shake flasks containing such media as soya flour and corn steep liquor. These flasks are shaken under conditions suitable for the growth of the organism. The shake flask cultures can then be used for the preparation of larger amounts of inoculum or, alternatively, they may be used to seed the fermentors directly. Aseptic conditions must be maintained during the preparation of the inoculum and during the subsequent fermentation.

In the fermentation, the desired medium is prepared and the pH of the medium adjusted to about 6.3–7.5, preferably 6.7–7.2. Calcium carbonate is included in the preferred medium. The medium so prepared is sterilized by heating at an elevated temperature under pressure, i.e., at about 120° C. The medium is then cooled to a temperature of approximately 24°–36° C., preferably 27°–34° C. The sterile medium is then inoculated under aseptic conditions with the inoculum prepared as described above.

The fermentation then proceeds at a temperature in the foregoing ranges with agitation and aeration using sterile air. The fermentation period may vary with different media and different operating conditions. Air is ordinarily supplied at the rate of about 0.25–1.5 volumes of free air per volume of medium per minute. The fermentation is continued for a period of time sufficient to achieve optimal and preferably maximal production of Phytostreptin or Phytoactin as the case may be. A fermentation period of 48–96 hour is ordinarily sufficient.

The antifungal may be recovered by a number of methods or, alternatively, the whole culture or whole broth may be used as such or may be concentrated or dried by suitable means. It is ordinarily preferred to recover the antifungal by precipitation or by solvent extraction of the whole culture or whole broth. In the precipitation recovery method, the whole culture is usually filtered or centrifuged at a preferred pH range of 7–8, and the filtrate is acidified to a preferred pH range of 3–5 to precipitate the antifungal. The preferred acid for this precipitation step is hydrochloric acid, although other acids may also be used. Since the culture mycelium contains appreciable quantities of the antifungal, the whole culture (without filtration) may, alternatively, be adjusted to pH 3–5 for the precipitation step.

The activity may be recovered from the precipitate or sediment by extraction with a suitable organic liquid in which it is soluble, such as methanol, ethanol, isopropanol, butanol, acetone or methylisobutyl ketone. The solvent solution may then be evaporated in vacuo, and the resulting residue further extracted with organic solvents. In the preferred method of recovery, the latter residue after evaporation is extracted exhaustively with methylisobutyl ketone, and the solvent solution is concentrated to small volume in vacuo. The antifungal may then be precipitated by the addition of 5 volumes of diethyl ether. The antifungal remaining in the methylisobutyl ketone-ether mother liquor may be recovered by concentrating the mother liquor to small volume in vacuo and adding 5 volumes of petroleum ether (30°–60° C.) to precipitate the activity. Alternatively, a solvent extract of the whole culture, whole broth or active precipitated sediment may be used as such or after concentration in vacuo without further purification.

CONTROL OF FUNGUS DISEASE

Fungus disease is controlled or combatted by applying one of the antifungals so that it ultimately contacts the causative fungus. To this end, the antifungal may be applied to the area where the fungus either is or ultimately may be present. Application may be made to the plants to be protected, to alternate hosts for the fungus, and/or to the soil in the vicinity. It is preferred to apply the antifungal on or in the vicinity of the plants under control. Where alternate hosts are required for spread of the fungus, it is possible in the alternative to apply the antifungal on or in the vicinity of the alternate host. The alternate hosts include the annual and perennial herbaceous plants and broad-leaved trees and shrubs. In this manner, nursery plantations, pine cone plantations, and pine forests, among others, may be protected. Seedlings, reproduction trees, pole trees, and mature trees may be treated.

The methods of treatment most commonly employed include, preferably, foliage spray, trunk spray and trunk injection. Soil drench treatment may also be effective, particularly in the case of seedlings, and to roots of seedlings may be submerged in a solution of the antifungal prior to planting.

The concentration of the antifungal in the spray solution is appropriately selected in the range of about 25–2000 parts per million, preferably in the range of 100–400 p.p.m., and applied at the rate of about 1–100 gallons per acre, preferably at the rate of 10–20 gallons per acre, so that about 0.1–800 grams of antifungal are applied per acre, preferably about 4–30 grams of antifungal per acre, in aqueous liquid, aqueous-organic liquid and organic liquid solutions and other types of dispersions, such as emulsions and wettable powder suspensions. Alternatively, a solid composition may be desirable, depending upon the type of application. The antifungal is then preferably present in a concentration of about 0.01% to 10% by weight, together with an inert preferably substantially non-phytotoxic agricultural type diluent, e.g., bentonite, diatomaceous earth, infusorial earth, pumice, etc. Fermentation solids may be employed as the diluent. The solid composition may be dusted on the plants or surrounding areas in the usual manner. Plant stickers and/or surface active agents may be incorporated in the solid compositions to assist in the application.

It is further preferred in the foilage spray treatment and the several other methods that the composition include a small proportion of a surface active agent, as described in my copending application, Serial No. 836,889, filed August 31, 1959. The concentration of surface active agent is preferably in the range of about 0.025 to 0.2% by weight for application to foilage. Spraying in nurseries, forests and plantations is preferably conducted during the growing season. Conventional aerial and ground spray apparatus are used.

It is recommended in trunk treatment that the antifungal be applied in aqueous solution or diluent oil to the point of run-off to slits made in the bark about the margin of canker discoloration in the trunk, or to the cut surface of excise trunk canker wounds. It is usually sufficient to spray about the lower one-third of the tree, or less in the case of taller trees. Aqueous, oil or aqueous-oil dispersions are recommended for injection by syringe into the distal end of trunk cankers. The concentration of antifungal for such treatments is 25 to 2000 p.p.m., preferably 100–400 parts per million.

Aqueous dispersions containing about 25 to 2000 p.p.m., preferably about 100 to 400 p.p.m. of the antifungal are recommended for soil drench treatment and root soak treatment. Alternatively, a dry preparation may be applied to the soil, containing about 0.01 to 10 percent of the antifungal admixed with a conventional solid diluent.

Phytostreptin is water soluble and Phytoactin is slightly soluble in water, producing an homogeneous colloidal solution. The antifungals are preferably first provided in the form of a concentrate in a water miscible organic solvent, which preferably contains a surface active agent. Purified forms of the antifungals may be employed, or for economy, technical grade fermentation products or concentrates thereof may be used. Such technical products may be obtained in any stage of the recovery of the antifungal from the fermentation product. It is preferred that the product be concentrated sufficiently so that the antifungal content is in excess of about 25 milligrams per gram of solids. In the latter case, it is more preferable to include a surface active agent, as the associated fermentation by-products are more readily maintained in dispersion. Also, as described in my aforesaid copending application Serial No. 836,889, increased activity has been noted with the combination containing a surface active agent. The purified and technical grade products likewise may be employed in the solid compositions, by intimately mixing the dry products, concentrates, or dilute dispersions thereof with diluents, and drying if necessary.

The solvent employed for producing the antifungal concentrate is preferably a lower alkanol such as methanol, ethanol, or, further preferably, isopropanol. The antifungal concentration in the concentrate is preferably in the range of 10 to 250 milligrams per milliliter, and the surface active agent is preferably present in a weight ratio to the antifungal in the range of about 5 to 125:1. The concentrate either containing or preferably first mixed with the surface active agent is diluted with water or organic liquid to the use concentration. The preferred concentration of the surface active agent in the solution applied for treatment is in the range of about 100 to 3500 p.p.m., or 0.01 to 0.35% by weight.

When employing the pure antifungals, the alkanol concentrates may be diluted with water to the use concentrations. The technical grade antifungal preparations are preferably first diluted with several additional volumes of the solvent, prior to dilution with water, especially in the case of the less water soluble Phytoactin. Alternatively, a surface active agent may be incorporated as indicated above, without need for additional solvent to maintain the dispersion.

The following Table V illustrates the preparation of representative clear solutions of either antifungal in fuel oil, which is one of the preferred oils from the standpoint of penetrability, low phytotoxicity, low evaporation, cost and availability. The solutions are prepared by dilution of the indicated antifungal concentrates in isopropanol, first with isopropanol and then with fuel oil. In these compositions, no surface active agent is present. Alternatively, a surface active agent can be included in the compositions.

Table V.—Antifungal Compositions and Dilutions

| Antifungal concentration in stock solution, mg./ml. of isopropanol | Amount of stock solution, ml. | Additional isopropanol, ml. | Fuel oil added, ml. | Final antifungal concentration, p.p.m. |
|---|---|---|---|---|
| 100 | 0.1 | 2 | 8 | 1,000 |
| 50 | 0.1 | 1.5 | 8.5 | 500 |
| 25 | 0.1 | 1 | 9 | 250 |
| 12.5 | 0.1 | 0.5 | 9.5 | 125 |
| [1] 100 | 0.1 | 3 | 7 | 1,000 |

[1] Technical grade antifungal, 150–350 mg. antifungal per gram of solids.

As an example of the preparation of a composition employing a surface active agent, clear solutions in oil are obtained with stock solutions of the antifungals having a concentration of 100 mg. per ml. of isopropanol, by adding to 0.1 ml. of the stock solution, 2 ml. of isopropanol, then 0.1 ml. of surface active agent, and then 8 ml. of fuel oil. The final antifungal concentration is 1000 p.p.m. and the concentration can be reduced by dilution with fuel oil.

The surface active agent may be, for example, a non-ionic, water-insoluble, oil-soluble alkyl aryl polyether alcohol (e.g., Triton X–45), a non-ionic iso-octyl phenoxy polyethoxy ethanol, such as the reaction production of octylphenol with 10 mols of ethylene oxide (e.g., Triton X–100), a non-ionic water-dispersible alkyl aryl polyether alcohol (e.g., Triton X–155), a non-ionic nonyl phenoxy polyoxyethylene ethanol (e.g., Igepal CO–430, Igepal CO–530, and Arctic Syntex 036), or a non-ionic polyoxyethylene sorbitol oleate-laurate (e.g., Atlox 1045A).

In tests conducted in the white pine stands in the national forests of the United States, Phytoactin was applied as a foliar spray by hand with nearly 100% effectiveness in killing white pine blister rust cankers. Aqueous dispersions containing 100 to 800 p.p.m. of Phytoactin and 0.1% of surface active agent (Triton X–155) were applied at the rate of about 20 gallons per acre. Phytostreptin was also found to be effective in like tests, with slightly lower activity than Phytoactin, so that Phytoactin is presently the preferred antifungal for this disease.

Phytoactin was very effectively sprayed on the white pine stands from a helicopter at the rate of about 10 gallons of spray solution per acre, with solutions containing 100–400 p.p.m. Phytoactin and 0.1% surface active agent (Triton X–155) in aqueous dispersion. The spray treatment was applied in June, and inspection during August of the same season showed most of the branch infections either dead or dying, and a definite action in the way of off-color and lack of spore production on white pine blister rust trunk cankers.

The invention thus provides a unique solution to the difficult problem of controlling plant fungus disease, which for years has taken a great toll of plantations and forests with resulting destruction of natural resources and financial loss. For the first time, foresters are provided with an effective weapon against the fungus scourges which can be applied from the air, removing the necessity for ground treatment of infected areas on a merely partial basis and requiring excessive manpower, materials, and equipment.

The invention is hereby claimed as follows:

1. The method of controlling fungus disease of coniferous plants which comprises contacting the causative fungus in the vicinity of said plants with a fungicidal amount of an antifungal selected from the group consisting of polyamidohygrostreptin and polyaminohygrostreptin.

2. The method of controlling fungus disease caused by Cronartium fungi which comprises contacting said fungi wtih a fungicidal amount of an antifungal selected from the group consisting of polyamidohygrostreptin and polyaminohygrostreptin.

3. The method of controlling plant fungus disease caused by Cronartium fungi which comprises contacting said fungi in the vicinity of susceptible plants with a fungicidal amount of an antifungal selected from the group consisting of polyamidohygrostreptin and polyaminohygrostreptin.

4. The method of controlling conifer rust fungus disease which comprises contacting plant hosts of the causative fungus with a fungicidal amount of an antifungal selected from the group consisting of polyamidohygrostreptin and polyaminohygrostreptin.

5. The method of controlling pine blister rust fungus disease which comprises contacting plant hosts of the causative fungus with a fungicidal amount of an antifungal selected from the group consisting of polyamidohygrostreptin and polyaminohygrostreptin.

6. The method of controlling white pine blister rust which comprises contacting at least one of the host plants, pine tree plants and Ribes plants, with a fungicidal amount of an antifungal selected from the group consisting of polyamidohygrostreptin and polyaminohygrostreptin.

7. The method of controlling southern fusiform rust which comprises contacting at least one of the host plants, pine tree plants and oak plants, with a fungicidal amount of an antifungal selected from the group consisting of polyamidohygrostreptin and polyaminohygrostreptin.

8. The method of controlling pine cone rust fungus disease which comprises contacting plant hosts of the causative fungus with a fungicidal amount of an antifungal selected from the group consisting of polyamidohygrostreptin and polyaminohygrostreptin.

9. The method of controlling fungus diseases of coniferous plants which comprises applying to the foliage of such plants a fungicidal amount of an antifungal from the group consisting of polyamidohygrostreptin and polyaminohygrostreptin.

10. The method of controlling fungus diseases caused by Cronartium fungi which comprises applying to the foliage of coniferous plants subject to attack by such fungi a fungicidal amount of a substance from the group consisting of polyamidohygrostreptin and polyaminohygrostreptin.

11. The method of controlling white pine blister rust which comprises applying to the foliage of white pine trees a fungicidal amount of a substance from the group consisting of polyamidohygrostreptin and polyaminohygrostreptin.

12. The method of controlling southern fusiform rust which comprises applying to the foliage of coniferous plants subject to attack by said rust a fungicidal amount of a substance from the group consisting of polyamidohygrostreptin and polyaminohygrostreptin.

No references cited.

UNITED STATES PATENT OFFICE
CERTIFICATE OF CORRECTION

Patent No. 3,067,102                                December 4, 1962

Jack Ziffer

It is hereby certified that error appears in the above numbered patent requiring correction and that the said Letters Patent should read as corrected below.

Column 3, line 18, for "rungi" read -- fungi --; column 5, line 55, for "Pondersoa" read -- Ponderosa --; line 65, for "Camandra" read -- Comandra --; lines 65 and 66, for "Cronartarium", in italics, read -- Cronartium --, in italics; line 68, for "swelings" read -- swellings --; column 6, line 1, for "Loblally" read -- Loblolly --; line 8, for "Atrh." read -- Arth. --; line 15, for "gardling" read -- girdling --; column 7, line 3, for "dethyl" read -- diethyl --; line 14, for "maltol" read -- Maltol --; column 9, Table II, first column, line 23 thereof, for "Rhizoctonia solain", in italics, read -- Rhizoctonia solani --, in italics; same table, line 37, for "bar." read -- var. --; line 59, for "Stereptomycetaceae" read -- Streptomycetaceae --, in italics; line 60, for "train" read -- strain --; column 10, line 22, for "Szapek" read -- Czapek --; column 11, line 39, for "supression" read -- suppression --; line 55, for "7.57-7.63" read -- 7.57-7.93 --; column 14, line 13, before "described" insert -- being --; column 16, line 18, for "to" read -- the --.

Signed and sealed this 29th day of October 1963.

(SEAL)
Attest:

ERNEST W. SWIDER                               EDWIN L. REYNOLDS
Attesting Officer                               Acting Commissioner
                                                                              of Patents